United States Patent
Berg

(10) Patent No.: US 6,222,558 B1
(45) Date of Patent: Apr. 24, 2001

(54) SYSTEM AND METHOD FOR EFFICIENTLY TRANSMITTING AND PROCESSING OBJECT INFORMATION BETWEEN AND AMONG A PLURALITY OF NETWORKED COMPUTERS

(76) Inventor: David A. Berg, 44 Bell St., East Palo Alto, CA (US) 94303

(*) Notice: Subject to any disclaimer, the term of this patent is extended or adjusted under 35 U.S.C. 154(b) by 0 days.

(21) Appl. No.: 09/273,993

(22) Filed: Mar. 22, 1999

Related U.S. Application Data

(60) Continuation of application No. 08/670,525, filed on Jun. 27, 1996, now Pat. No. 5,886,707, which is a division of application No. 07/615,986, filed on Nov. 20, 1990, now Pat. No. 5,544,317.

(51) Int. Cl.[7] .................................................. G06T 9/00
(52) U.S. Cl. ................................. 345/433; 345/329
(58) Field of Search .................................. 345/433, 329; 707/502; 709/204, 230

(56) References Cited

U.S. PATENT DOCUMENTS

| | | | |
|---|---|---|---|
| 4,853,875 | * | 8/1989 | Brown .................................. 709/228 |
| 4,858,112 | * | 8/1989 | Puerzer et al. ....................... 709/230 |
| 5,442,771 | * | 8/1995 | Filepp et al. ......................... 709/219 |
| 5,544,317 | * | 8/1996 | Berg ...................................... 709/235 |
| 5,799,320 | * | 8/1998 | Klug ...................................... 707/201 |
| 5,886,707 | * | 3/1999 | Berg ...................................... 345/433 |

* cited by examiner

*Primary Examiner*—Stephen S. Hong
(74) *Attorney, Agent, or Firm*—Flehr Hohbach Test Albritton & Herbert LLP

(57) ABSTRACT

The simultaneous, real time graphical information is shared between two or more intelligent work stations linked together in conversation via a network. Transmission of the essence of a graphical image is accomplished by fixed and variable length portions. The fixed portion describes the type of command and the size or length of the variable length portion. The variable length portion describes the detailed information need to properly process. Thus, the complete length of data is known a priori. While a network is constipated or congested and a drawing operation is being performed by a user, the communication endpoints are configured as non-blocking, commands are stored in a FIFO (first-in, first-out) queue, and the operating system reports how much of the drawing operation was transferred. After the network becomes unconstipated, writing of any partially written command or stored commands in the queue are completed. The graphical image may be displayed in a window or canvas designated for drawing. By transmitting the parameters defining the object and its commands, the speed of the transmission is increased over pixel-by-pixel transmission.

20 Claims, 7 Drawing Sheets

SYSTEM AND METHOD FOR EFFICIENTLY TRANSMITTING AND PROCESSING OBJECT INFORMATION BETWEEN AND AMONG A PLURALITY OF NETWORKED COMPUTERS

This is a continuation of application Ser. No. 08/670,525 filed Jun. 27, 1996 now U.S. Pat. No. 5,886,707, which is a Division of U.S. patent application Ser. No. 07/615,986, filed Nov. 20, 1990, now U.S. Pat. No. 5,544,317.

BACKGROUND OF THE INVENTION

1. Field of the Invention

The present invention relates to graphics and drawing applications for computers, and more particularly to a method for the interactional presentation of graphics through a coupled network of intelligent computer work stations.

2. Brief Description of the Prior Art

Many presentation graphics and drawing applications exist for computers. Some notable examples are MACDRAW™ for APPLE™ MACINTOSH™ computers and SUNDRAW™ for Sun Microsystems work stations. These programs allow the user to prepare graphical drawings depicting virtually any subject matter. However, they are limited in that they allow only one person to work on the drawing at a time; they do not allow interactive networking of the graphical drawings.

Methods and computer programs do exist which allow users to share information over a network simultaneously, but these are not graphically oriented. The most notable example of this is a program called TALK, which is available as part of 4.3 BSD UNIX. This program allows one user using a work station to initiate a conversation with another user on a different work station. The program allows only the transfer of textual information. Once a conversation is started, the program splits the screen horizontally. The characters inputted by user A appear on the top half of A's screen, and simultaneously appear on the lower half of the screen on the user B's work station. In like manner, when user B types on B's work station, the input appears on the top half of B's screen and the bottom half of user A's screen. In addition to the fact that the TALK program only allows sharing of textual information, it is limited in that the conversation can be between only two users.

There is also a freely available public domain program for the X-Windows system called WScrawl which allows users to share graphical information. However, it works by taking advantage of special features of X-Windows. A simple program is run which opens a single window on each of multiple machines. Then graphics drawn in one window is replicated in the other windows by making identical X-Windows protocol requests. This differs from the current invention in several ways. First, there is only one program being run. Second, the graphics being drawn is not reduced to its essence and then transmitted. Rather, the graphics are merely drawn in multiple windows which are located on different machines. This approach has many disadvantages. First of all, there is no way to distinguish between what multiple users have drawn; everything is merged together. Second, since the essence of the graphic is not transmitted, there is no way for another user to "grab" the image and modify it. Third, and possibly most importantly, this scheme will work only under the X-Windows system. There is no way to make it interoperate with other windowing systems such as Apple's MacOS™ or Microsoft's MICROSOFT WINDOWS™. The current invention has none of these restrictions.

Finally, the POSTSCRIPT™ page description language has been used to transmit graphical information over a network, most notably in Sun Microsystems NEWS™ (Network Extensible Windowing System). However, POSTSCRIPT™ has not facilities for describing the interactions which a use might engage in when using a drawing program. For example, POSTSCRIPT™ has no means of indicating that a specific object has moved from one location to another, or that an object has been cut. In fact, the notion of a graphical object is alien to PostScript, which is suited mainly to describing static images so they can be printed.

SUMMARY OF THE INVENTION

It is an object of the present invention to allow the simultaneous, real-time sharing of graphical information over a network between two or more intelligent work stations on a network.

It is another object of the present invention to minimize the data necessary to describe the graphical information, for the rapid transmittal of the data between work stations.

It is a further object of the present invention to avoid using pixel-by-pixel description and transmission of data describing a graphical image, such that the speed of transmission is increased.

It is yet another object of the present invention to develop and utilize a protocol including a series of commands each having a fixed data bit length portion and a description portion having a variable data bit length.

It is yet a further object of the present invention to provide a series of commands which describe the type of graphical manipulation that is being conducted, the type of graphical figure upon which it is being conducted and the location of the screen bits at which it is being conducted, such that each of the terminals in the network are provided with sufficient information to replicate the graphical production of the generating work station.

It is still another object of the present invention to provide a simplified set of commands which is concise for rapid transmission and reception.

The user of a work station (user A) has a means of inputting graphical information to a work station, such as a graphical drawing program. As graphical information is input by user A, it is reduced to a minimal description and an identifier is assigned to it. This description and identifier is termed an object description, and the object description plus other information is formulated into a command that is then transmitted via the network to all other work stations engaged in the conversation. When the other work stations in the conversation receive the command over the network from work station A, they depict that information from the command on the local display in an area (window or canvas) designated for that purpose.

Each command involves a division of instructions into a command type portion having a fixed length and a graphical object description portion having a variable length, in order to transmit data structures that describe graphical objects and operations on those objects.

It is an advantage of the present invention that it allows the simultaneous, real-time sharing of graphical information over a network between two or more intelligent work stations on a network.

It is another advantage of the present invention that it minimizes the data necessary to describe the graphical information, for the rapid transmittal of the data between work stations.

It is a further advantage of the present invention that it avoids using pixel-by-pixel description and transmission of data describing a graphical image, such that the speed of transmission is increased.

It is yet another advantage of the present invention that it develops and utilizes a protocol including a series of commands each having a fixed data bit length portion and a description portion having a variable data bit length.

It is a further advantage of the present invention that it provides a series of commands which describe the type of graphical manipulation that is being conducted, the type of graphical figure upon which it is being conducted and the location of the screen bits at which it is being conducted, such that each of the terminals in the network are provided with sufficient information to replicate the graphical production of the generating work station.

It is still another advantage of the present invention that it provides a simplified set of commands which is concise for rapid transmission and reception.

The foregoing and other objects, features and advantages of the present invention will become apparent from the following detailed description of the preferred embodiments which make reference to the several figures of the drawing.

IN THE DRAWING

DETAILED DESCRIPTION OF THE PREFERRED EMBODIMENT

Figure 1:
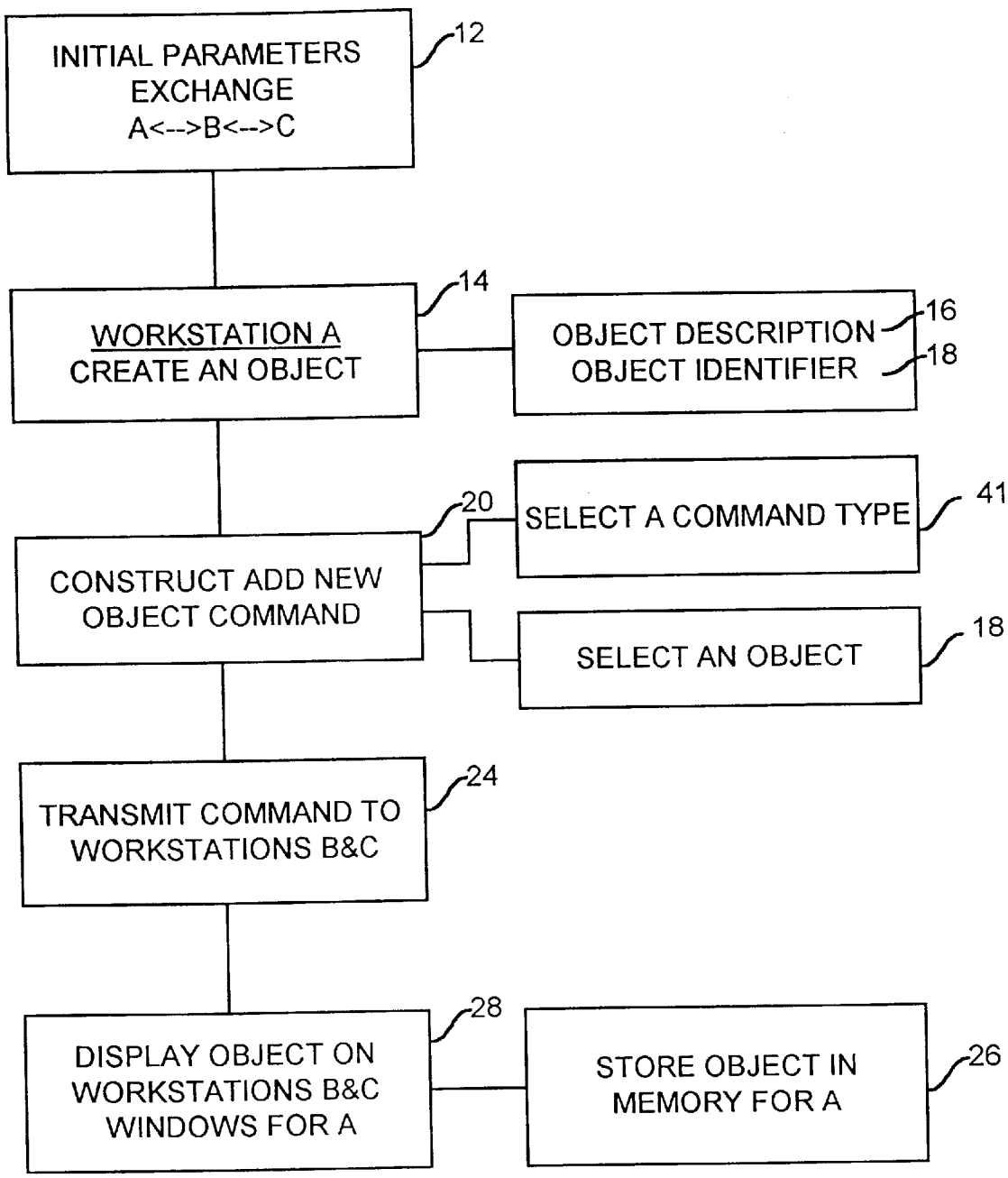
FIG. 1 is a schematic diagram of the communication of graphical information between work stations.

Referring to FIG. 1, when a session or conversation is begun between two or more work stations, they exchange certain information. This information includes a list of other users already involved in the conversation, the revision level each program is using, and possibly details such as the size of the canvas (virtual drawing area) each is using locally. This is referred to as the initial parameter exchange 12.

A work station which is becoming involved in the conversation for the first time will attempt to connect to the other members of the conversation. After the initial parameter exchange, the work station newly added to the conversation will be sent a complete description of all objects on the screen of each of the work stations already involved. With this method, new parties can be included in the conversation in a real-time, on demand basis.

The user of a work station (user A) has a means of inputting graphical information into A's work station, such as a graphical drawing program 14. As graphical information is input by user A, it is reduced to a minimal object description 16 and an object identifier 18 is assigned to it. This object description 16 and object identifier 18 plus other information described below is combined in an add new object command 20, and the command 20 is then transmitted 24 via the network to all other work stations engaged in the conversation, such as work stations B and C in FIG. 1. When the other work stations in the conversation receive the information over the network from work station A, they store the information 26 in a portion of memory reserved for work station A, and they depict that information from the command on the local display in an area (window or canvas) designated for that purpose 28.

Figure 2:
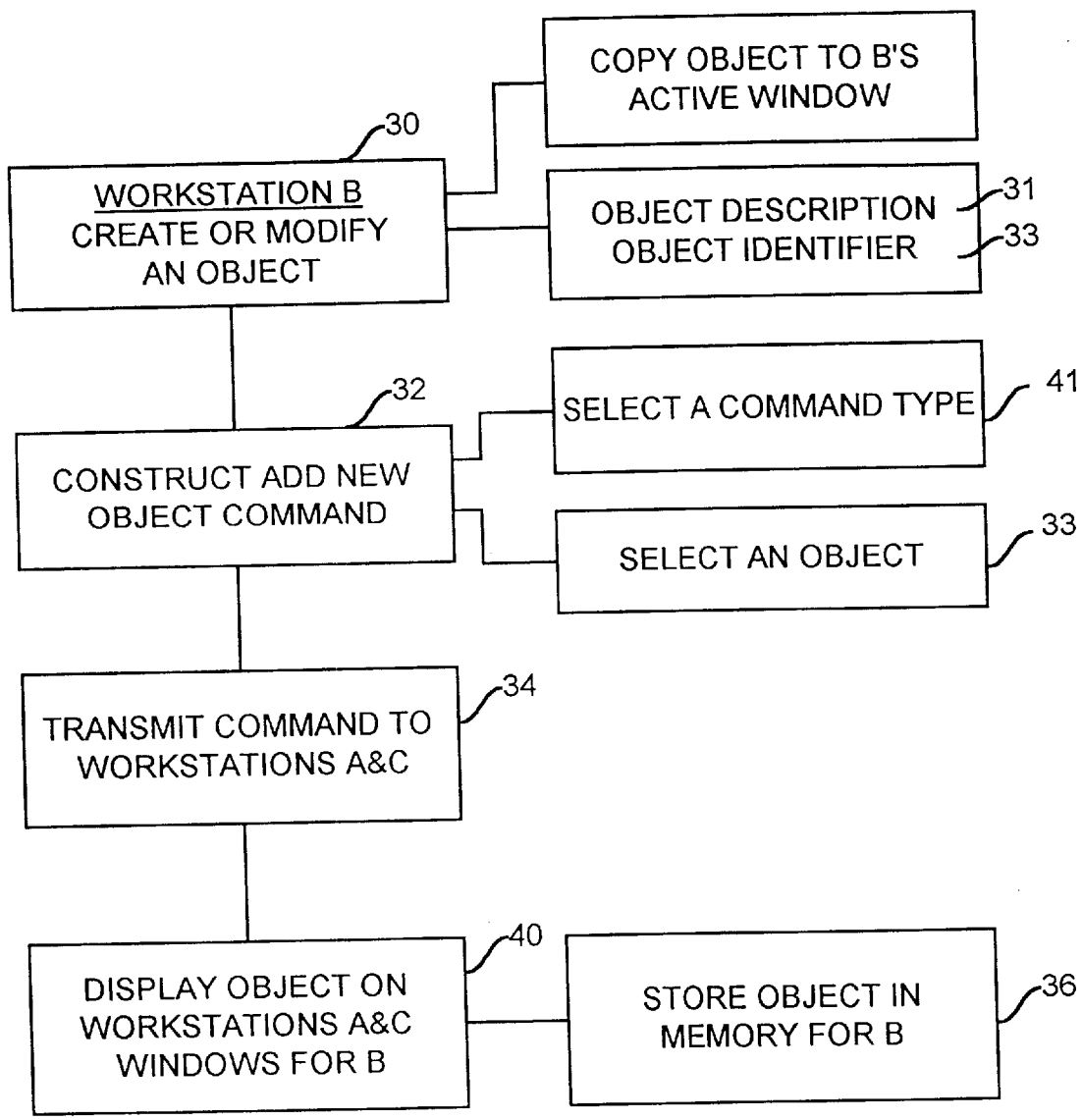
FIG. 2 is a further schematic diagram of the communication of graphical information between work stations.

In like manner, as depicted in FIG. 2, when a user of a remote machine, such as work station B, inputs graphical information 30, the object is depicted on her machine, reduced to its essence as an object description 31 and an object identifier 33, and it is combined in an add new object command 32, and transmitted 34 to all other work stations in the conversation, such as work stations A and C in FIG. 2, for memory storage 36 and for display in windows 40 reserved for input from work station B. A user can't modify another users drawing on the other user's work station, but a user can pick up a received drawing and copy it from memory 36 to her drawing area. She can then modify the copied drawing and it is transmitted to the other work stations.

When a user copies the drawing of another user to her drawing area, the preexisting drawing in her drawing area is erased from the screen. In the preferred embodiment, the sequence of commands that were utilized to create the erased drawing are retained in the user's memory storage. At a later time, the user can recall the erased drawing to her computer screen for further modification. Because the entire sequence of commands which were utilized to create the drawing are retained in computer memory, further commands to modify the drawing can be initiated based upon the object identifiers that are associated with the command sequence of the recalled drawing.

For the purposes of drawing graphical objects, there are at least 5 basic operations which a user would perform: creation, resizing, movement, aggregation and deletion. When an object is created on machine A, an indication of the creation of a new object is sent to every other machine in the conversation, including a description of the object 16, and a unique object identifier 18 is sent with the new object. That information forms the basis of each command. The object identifier 18 is used subsequently if the object is referred to in a subsequent operation (e.g., deleted, etc.). When each other machine receives notification of the creation of a new object on machine A, it adds the object to the list of objects it maintains in memory 36 for machine A and draws that object on its screen that represents the output of work station A.

For some objects, most notably text, it is more efficacious for the information about the object to be disseminated as the object is being created. For such instances, an indication of the commencement of object creation is sent, followed by data describing the development of the object and terminated by an indication of object completion.

Figure 3:
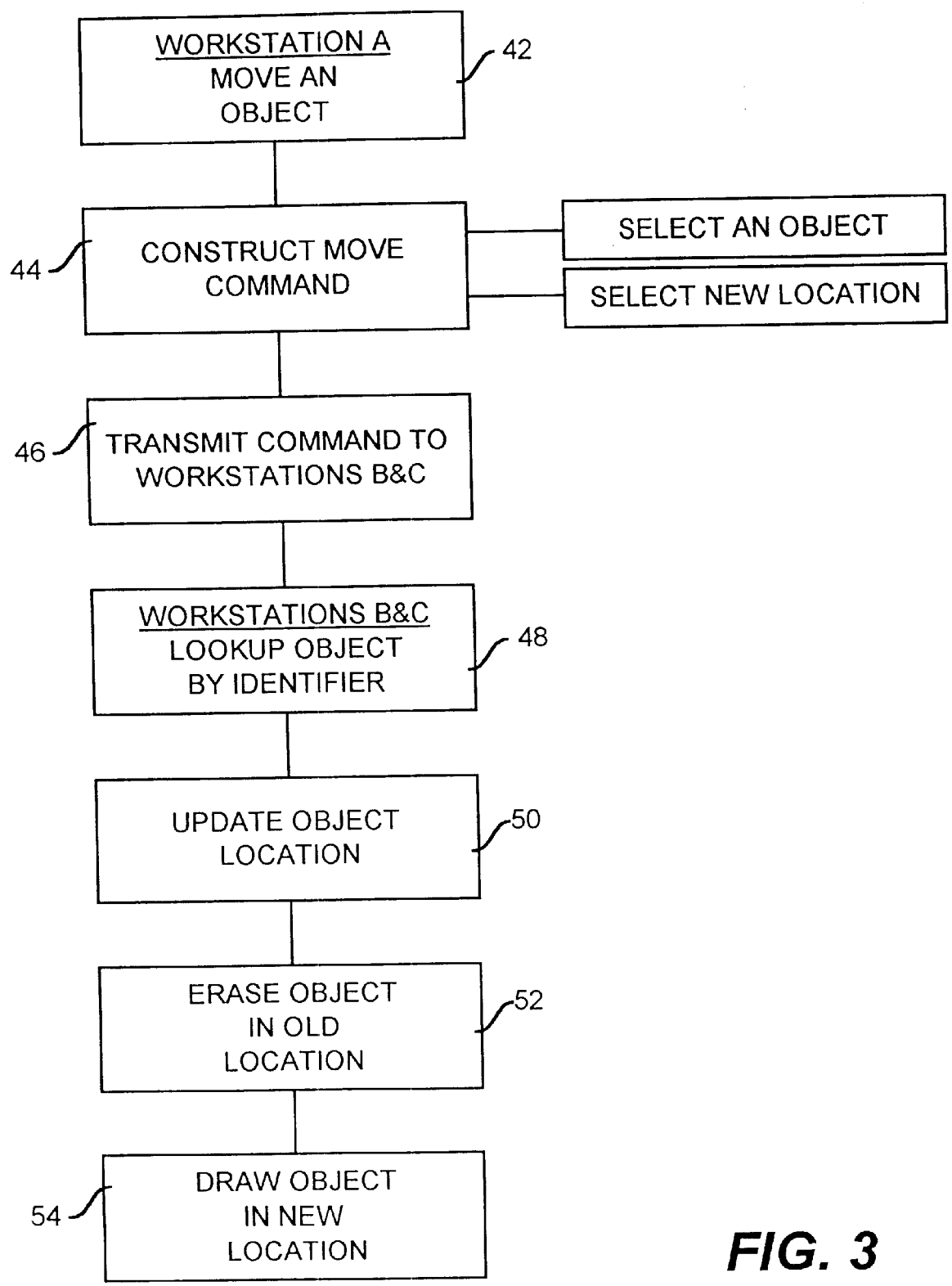
FIG. 3 is a schematic diagram of the method for moving a graphical object depicted upon the computer screens.

If the user of machine A performs another operation (resizing, movement, etc.) on an object, a command 20 reflecting this operation is constructed by selecting a command type 41 that is sent to all other machines, this command 20 includes the unique identifier 18 for the object, and a complete description of what was done. For example, as depicted in FIG. 3, suppose user A moves an object she has already drawn from one place to another (42). An object move command is constructed 44 specifying the object identifier of the object moved and the relative displacement of the new location of the object 44. This is transmitted to work stations B and C 46. Work stations B and C independently look up the object specified in the move command 48. The object location maintained in the object description data structure in machines B and C is updated 50. Work stations B and C erase the depiction of the object in the old location 52. Then work stations B & C draw the object in the new location 54.

Figure 4:
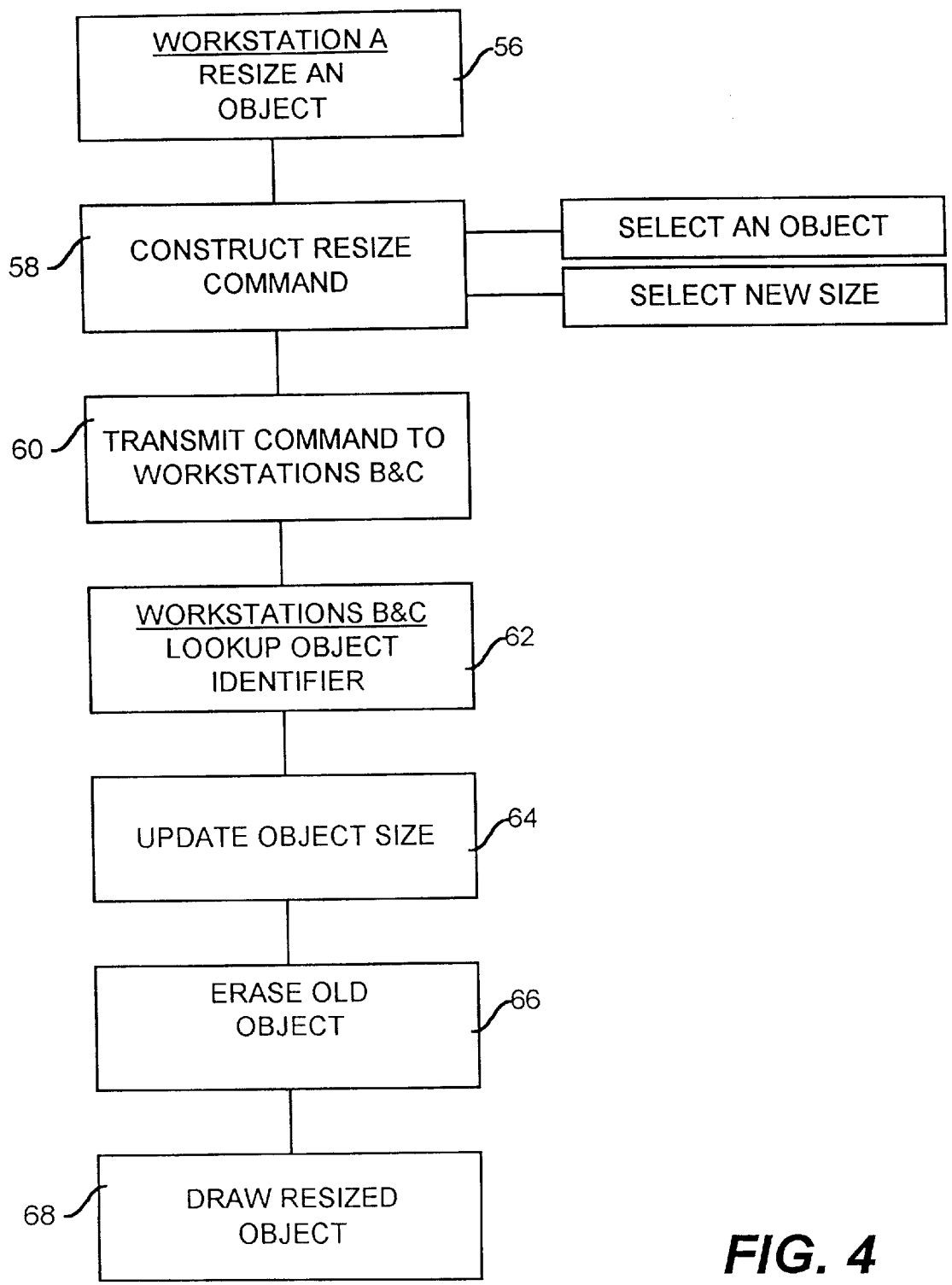
FIG. 4 is a schematic diagram of the method for resizing an object depicted upon the computer screens.

If user A resizes an object 56, as depicted in FIG. 4, an object resize command containing the object identifier and information describing the new object size and shape is constructed 58. This is transmitted to work stations B and C 60. Work stations B and C look up the object 62. They update the object information 64; then they erase the old object 66 and draw the resized object 68.

Figure 5:
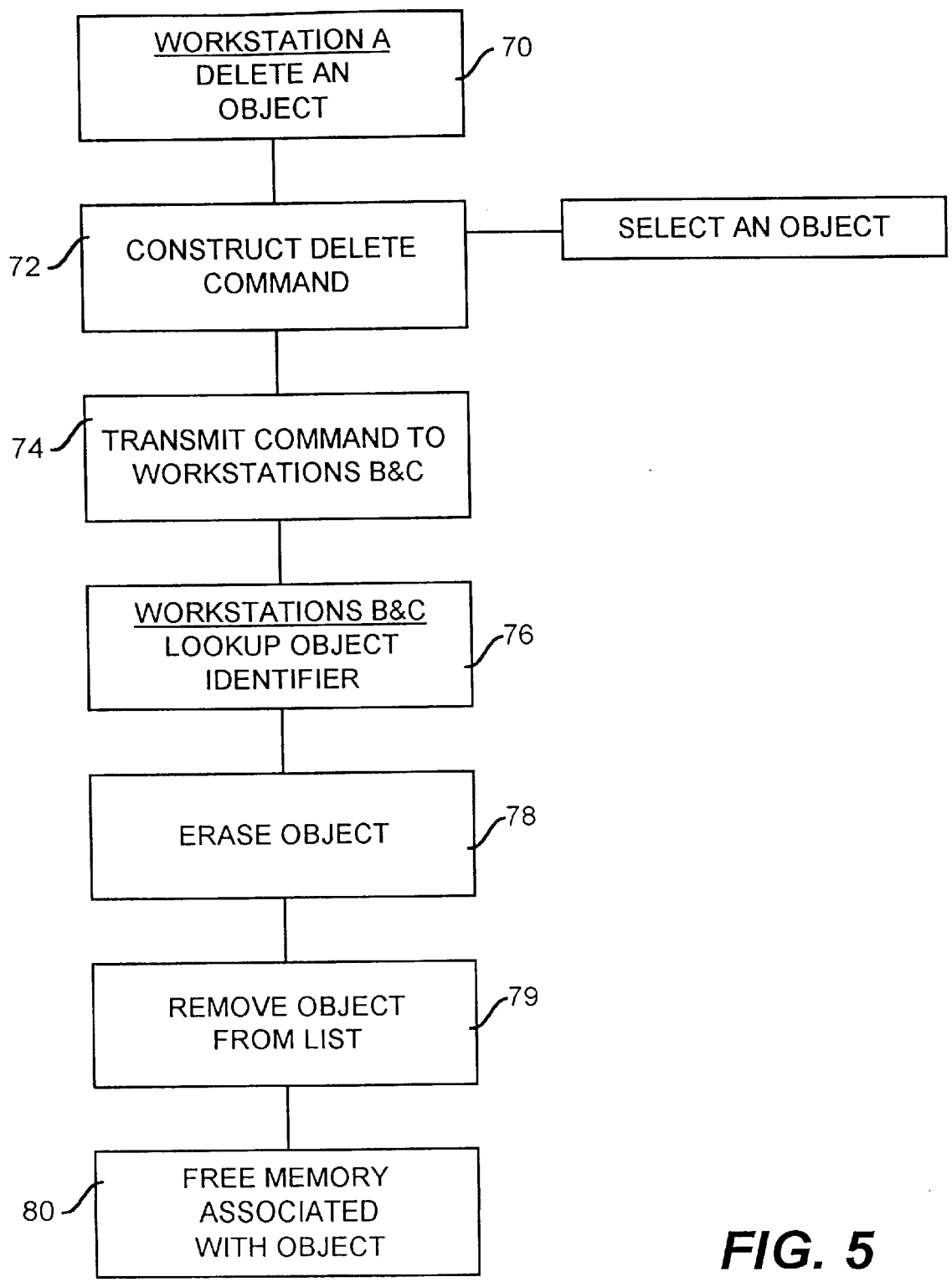
FIG. 5 is a schematic diagram of the method for deleting a graphical object depicted upon the computer screens.

Similarly, if user A deletes (cuts) an object 70, as depicted in FIG. 5, an object cut command is constructed 72. This command is transmitted to work stations B and C 74. Work stations B and C look up the object 76. They then erase the object on the screen 78 and remove the object from their list of user A's objects 79. The memory associated with the object is then freed 80.

Figure 6:
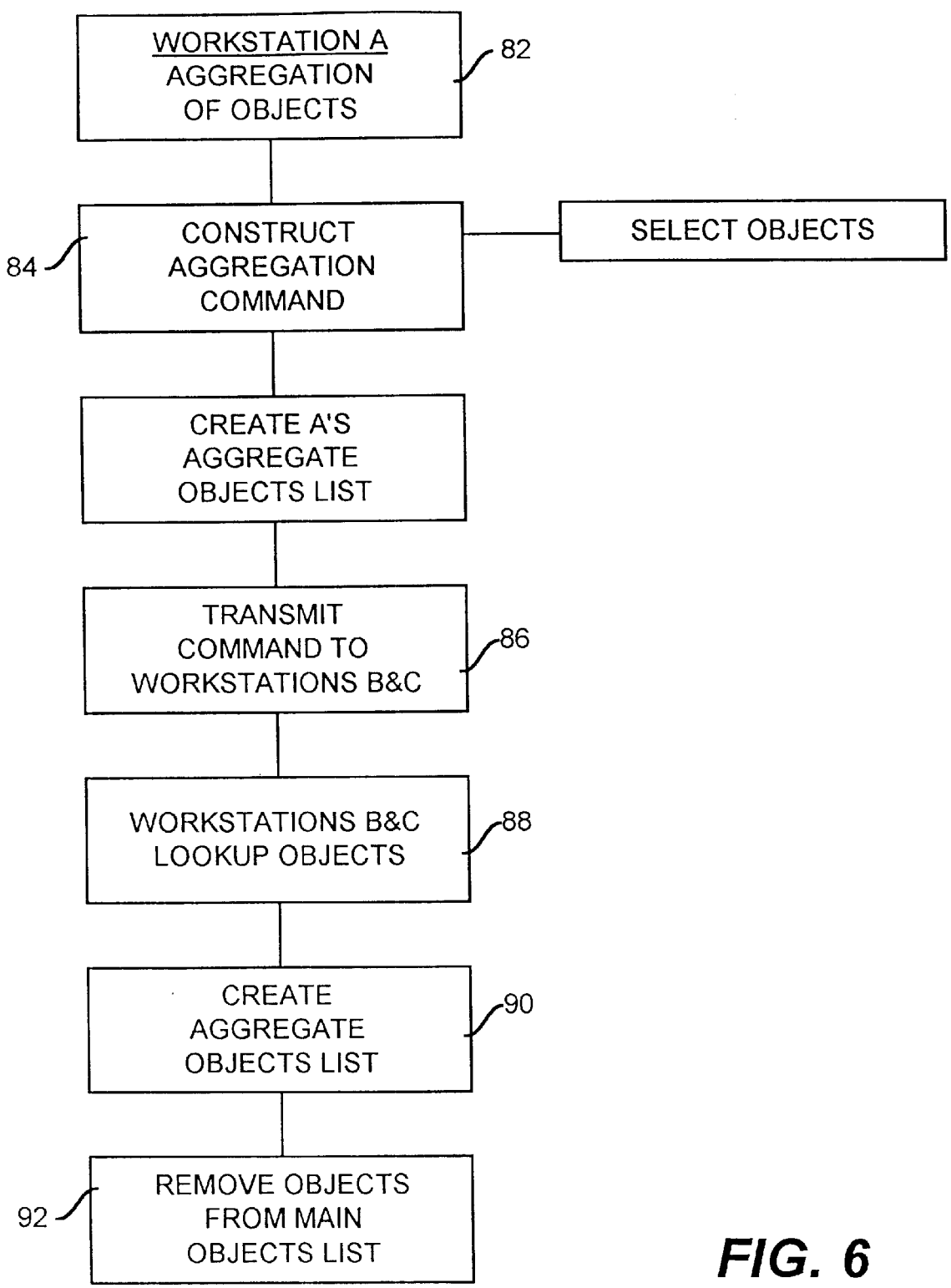
FIG. 6 is a schematic diagram of the method for aggregating graphical objects depicted on the computer screens.

If user A aggregates (combines with another) an object 82, an object aggregation command is constructed 84, see FIG. 6. This command is transmitted to work stations B and C 86. Work stations B and C look up the aggregate object to which the other object is to be added, and the other object to add as well 88. The object to aggregate is then added to the list of objects comprising the aggregate 90 and is deleted from the list of independent objects for work station A 92.

Figure 7:
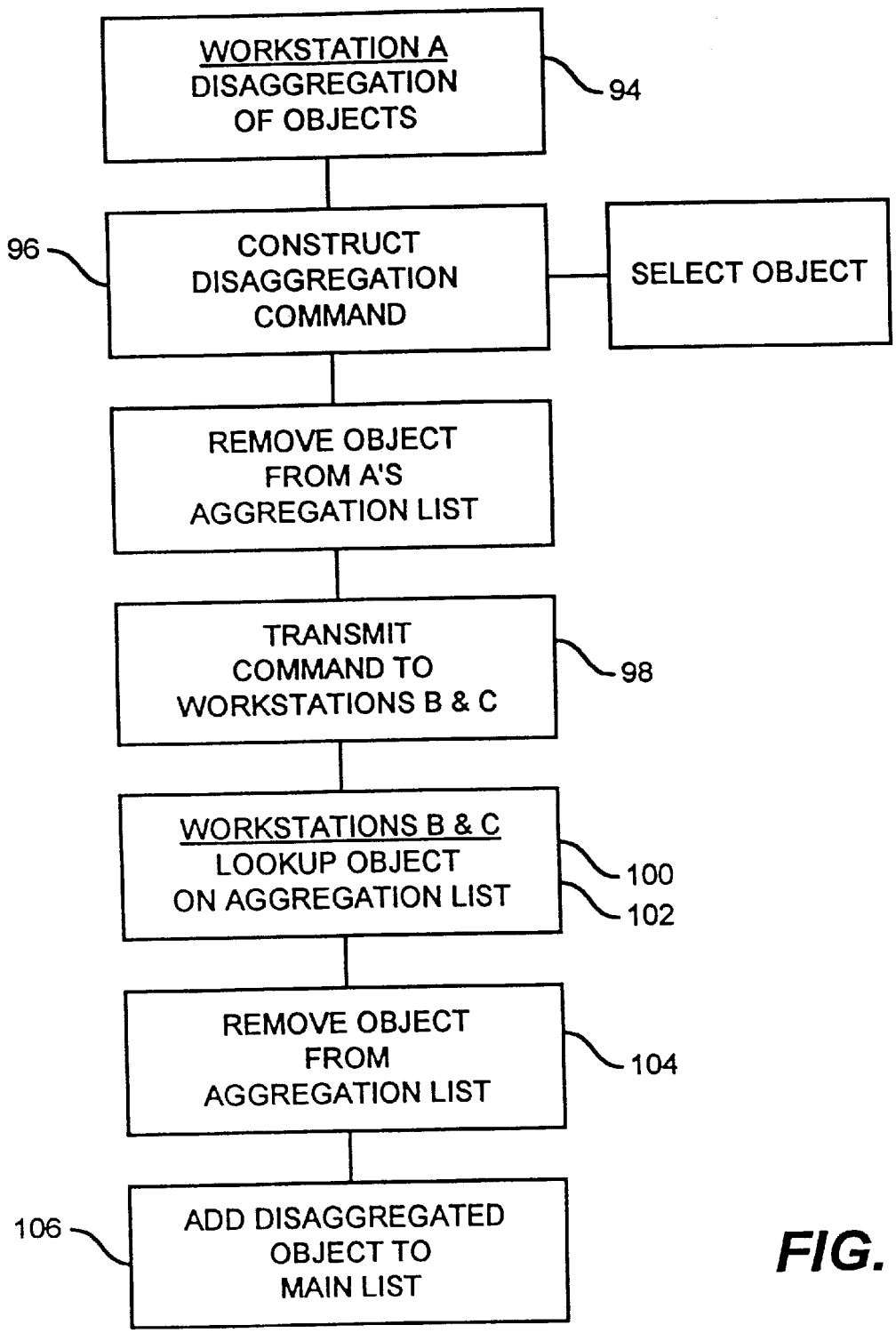
FIG. 7 is a schematic diagram of the method for disaggregating graphical objects depicted upon the computer screens.

If user A disaggregates an object 94, an object disaggregation command is constructed 96, see FIG. 7. This command is transmitted to work stations B and C. Work stations B and C look up the aggregate on their list of user A's objects 100. They then look up the object to disaggregate on the object list associated with the aggregate 102. They then remove the object from the aggregate's list 104 and add it to the main list 106 of independent objects for work station A. Aggregate objects can also be nested. That is, an aggregate object can consist of other aggregate objects, which can in turn consist of other aggregate objects.

In order to accomplish the sharing of graphical information over a network, a protocol is necessary to allow each machine to describe what is happening locally to every other machine in the conversation. This protocol consists of a set of commands which are transmitted over the network. Some of the commands refer to graphical objects. The essence of a particular set of commands is to transmit the contents of a screen in terms of the objects on the screen and operations on the objects. Objects are described in the most concise fashion necessary to capture their essence. In the preferred embodiment, each command consists of a fixed length portion followed by a (possibly empty) variable length portion. The fixed length portion describes the type of command and the length of the variable portion. The variable portion contains the detailed information needed to properly process the command. For example, for moving an object, the fixed length portion will identify the type of command and the length of the variable length portion. The variable portion will contain the identifier for the object as well as the displacement of the object.

The protocol consists of the following type of commands.

| Command | Description |
| --- | --- |
| Add New Object | A new object has been added to the local screen |
| Move Object | An object has been moved |
| Resize Object | An object's size has been changed |
| Cut Object | An object has been deleted from the local screen |
| Add Object to Aggregate Object | An object has been added to an aggregate |
| Remove Object From Aggregate | An object has been removed from an aggregation |
| Clear Screen | All objects have been removed from the local screen |
| Begin special mode | A special mode (e.g., Text Entry) has been entered |
| Special mode data | Data corresponding to an already-entered special mode |
| End special mode | The previously entered special mode has been terminated |

Commands are not limited to this set and additional commands can be added as needed. For example, commands to rotate and duplicate an object could be added, and commands to change aspects of an object description, such as fill pattern, line style or color can also be added.

As described above, each command consists of a fixed length portion followed by a variable length portion. The fixed length portion of a command is described by the following table, wherein each field is 32 bits in length in the preferred embodiment. It is not necessary to specify a user identifier in a command since a separate logical connection is used between each pair of machines in a conversation.

Command Type
Command Detail
Length
Command Detail
Pointer

The contents of the variable length portion, called the command details, varies depending on the type of command and object, as described in the following table:

| Command | COMMAND DETAILS (VARIABLE LENGTH) |
| --- | --- |
| Add New Object | Object Description |
| Move Object | Object Identifier; Displacement to new location |
| Resize Object | Object Description Details |
| Cut Object | Object Identifier |
| Add Object to Aggregate Object | Object Identifier of Aggregate Object; Object Identifier of Object added to Aggregate |
| Remove object From Aggregate | Object Identifier of Aggregate Object; Object Identifier of Object removed from Aggregate |
| Clear Screen | None |

| Command | COMMAND DETAILS (VARIABLE LENGTH) |
|---|---|
| Begin special mode | Special mode type indicator; Location |
| Special mode data | Depends on mode type |
| End special mode | Object Identifier with which to tag resultant object |

The object description portion of a command detail (used for the add new object command) also consists of a fixed length portion and a variable length portion. The fixed length portion contains information which is not specific to a particular type of object, while the variable portion contains information which is unique to objects of that type. For example, the fixed length portion of the object description contains the object identifier, the object type and the object location. In the preferred embodiment, the fields of the fixed length portion are 32 bits in length. Location information consists of 16 bits each for horizontal (x coordinate) and vertical (y coordinate) position.

A fixed length portion of an object description is as follows:

Object Identifier
Object Type
Object Location
Object Detail Length
Object Bounding Box
Object Detail Pointer The object bounding box is the rectangle which fully contains the object. It is used in the object selection logic to facilitate local object editing. If a point in a window is not in an object's bounding box, then that point can not be used to select the object for editing. Additional elements can be added to the fixed length portion as needed. For example, it is possible to add elements such as line width, line style, fill pattern and color.

The contents of the variable length portion of the object description depends on the object type. For example, for a circle, the variable length object details consist of the location of the center of the circle and its radius. The variable length object details for several possible objects are described in the following table:

| | |
|---|---|
| Scribble | Point List; Point Count |
| String | Array of characters in string; Length of character array; Location of string; Location of current character |
| Text | Array of strings in text; Length of string array |
| Square | Location of upper left; Length of side |
| Rectangle | Location of upper left; Width; Height |
| Circle | Location of center; Radius |
| Scribble | Point List; Point Count |
| Ellipse | Location of center; Width; Height |

Additional objects can be added as needed, And the description of an object can change. For example, strings could be modified to include the font to use to render the string.

Structuring the description of a graphical object in this fashion allows a virtually infinite variety of different types to be represented, since the object details can be of whatever length is necessary to fully describe any object and since the object details can be interpreted in any manner necessary, depending on the object type. Furthermore, structuring object descriptions in this fashion allow their transmission over a network in relatively simple fashion.

In the preferred embodiment, when the object description is transmitted and received, the fixed length portion and variable length portion are contiguous. When the object description is received, the buffer containing its description may be decomposed into the fixed length portion and variable length portion. The object header and details are not necessarily stored in contiguous memory. In fact, the detail information may not be in contiguous memory either. The detail information may contain pointers to other areas in memory. This is the case with text, which is stored as an array of pointers to character strings.

There are two traditional problems with networking protocols which exchange binary data, as does the present invention. The first is byte ordering, and the second is holes due to data alignment. Byte ordering refers to the manner in which different machines store quantities of more than 8 bits in length. Some processors (such as DEC VAX processors and Intel 8086-family processors) store the high order portion in high memory. Other processors (Sun SPARC, Motorola 68000 and 88000) store the high order portion in low memory. Networking protocols generally have a "canonical," or standard way of transmitting such quantities. For example, TCP/IP always transmits the high order byte first, proceeding to the low order byte. Network canonical presentation of 16 and 32 bit quantities are adhered to in the preferred embodiment.

The other problem occurs in processors which force alignment on half word (16 bit) or full word (32 bit) boundaries within structures. Since the protocol information is being transmitted in a binary format, it is important for structures to be stored identically on all machines in a conversation. When this is not possible, it will be the responsibility of each machine to convert received data structures into a format usable locally. This problem will be minimized by designing the data structures to be used so that each field is naturally aligned on an appropriate boundary without holes.

For example, in the preferred embodiment, single byte quantities are not followed by half or full word quantities, and half word quantities are not followed by full word quantities. Two single byte quantities can be followed either by a half word quantity, or two single byte quantities. A half word quantity can be followed by either another half word quantity or two single byte quantities.

This protocol represents a significant improvement over fax technology, which transmits a bit map of a graphical image. Instead of transmitting a bit by bit description of the image, we transmit a description of each of the objects (e.g., squares, circles, text, etc.) which make up the image. This has two advantages. The first is concision. Describing a square by its upper left hand corner and length of side is considerably more concise than describing each bit the square contains. An image of 1000 pixels by 1000 pixels represents a million bits of information if the image is black and white, and potentially as much as 24 million bits if the image is in color. This represents a huge amount of data to transmit over a network, and would bring all but the fastest existing networks to their knees in short order.

The second advantage to this approach is preservation of information. When a bit map is transferred, there is a resultant loss of information as to the essence of the image. What was created as a set of geometric objects becomes a bunch of unrelated bits. The receiver of this bunch of bits has no way to determine from it the original constituent parts as they were drawn. All that is known is that some bits are on and some are off, but not that some of the bits represent a circle, a square, some text, etc.

In the present invention, there is another further refinement in concision. A typical computer program which stored graphical information would probably use a data structure known as a union. This type of data structure can be used to store multiple different kinds of data, while consuming only the amount of space required for the largest kind. A union can only be used for one type of data at time, since the fields representing different types may overlap. It would be impractical to use such a data structure to transmit a description over a network because potentially large parts of the union would be unused. By dividing the description of a graphical object into a fixed and variable length portion, this problem can be avoided. Only as much data as is necessary to describe a specific object is transmitted, instead of the amount necessary to describe the most detailed object. This approach has other advantages, too. The description of an object may be distributed throughout the memory of the machine on which it was created. However, in order to transmit it to another machine, it must be gathered together. Since we can accommodate descriptions of varying length, this becomes practical.

A final advantage of this approach is that it simplifies reading and writing of commands and descriptions over a network. When writing, the fixed and variable portions of a command and/or object are collected into a contiguous block of memory. They can then be written in one write operation. When a command is read, it is read in two operations. This is necessary since only the size of the fixed length portion is known. This is read in, and it indicates the length of the variable length portion (if any). This allows the variable length portion to then be read in.

Taking this approach becomes very important when communicating over a network in a graphics program. Network throughput can become constipated. Under normal circumstances, this causes read and write operations to block; that is, to cause the process requesting them to become idled until the operation can be completed. This is not acceptable for graphics programs, since the user may be in the midst of drawing something on her screen, and does not want that to be interrupted due to network constipation. Thus, the communication endpoints must be configured as non-blocking. This means that if the read or write operation cannot be completed, the operating system reports how much was transferred and returns to the calling program. This introduces a level of complexity to the application, as it must now manage the processing of partially complete operations. Doing so becomes much simpler if the data being transferred is of fixed size. Since this is not possible, the next best approach is to divide the data into a fixed length portion and a variable length portion.

Since the data sequences are in contiguous memory on writes, the process of writing the data can be essentially handled as if it was of a fixed length; that is, the complete length is known a priori. If the operation cannot be completed at once, the amount of data actually transferred is recorded. When the operation can be re-attempted, the program knows from where to resume writing, and how much to write. While the network is constipated, the commands which correspond to the user's actions are accumulated in a first-in first-out queue. When the network becomes unconstipated, the writing of the command which was partially written is completed, and subsequently queued commands are then written, until there are no more queued commands or the network again becomes constipated.

On reading, the problem is a bit more complex, since the reader does not know the length of the complete sequence. However, since there are only two parts, the operation is greatly simplified. If a read completes only partially, the amount of data read is recorded, in addition to which part of the message (either the fixed or variable) was being read. When the operation can be re-attempted, the program knows not only how much to read, but also which part of the message was being read.

The underlying mechanism of the network is not significant. Many networking protocols exist, including proprietary solutions such as DECNET and non-proprietary solutions such as DoD Internet Protocols (TCP/IP). The only requirement is that the network provide services to reliably transfer data between two machines in a timely fashion. If more than one machine is involved in the conversation, each pair of machines will have its own network connection. Further, while one preferred embodiment of this invention assumes that a connection-oriented transport service is being provided between machines, this is not necessary. A connection-less (or datagram) service can suffice. In the same way that the exact nature of the network service used is not relevant to the invention, neither is the nature of the computers involved. The productive use of this invention is not limited to work stations or personal computers. It is intended to be used in any application where graphical information is to be shared between machines on a real-time basis.

Similarly, the invention is not limited to simply displaying graphical information. For example, the graphical input may be sent to another machine to be translated into text and then sent back for redisplay. Another application of this technology would be in an environment where a computer generates a series of images for sequential display and a work station is used to display the image. The computer could essentially generate animated sequences by defining a set of objects and then sending commands which describe their movement and other changes to them (removal or cutting, resizing, rotation, etc.). Another application of this technology is in presenting graphical animation. A script describing a sequence of images could be prepared, stored and then replayed on a single machine using a single program.

The invention is in essence a means of sharing graphical information between machines. This is done by reducing the graphical information to the minimal amount of data required to represent it, and transmitting that data between machines. While the invention has been shown and described with reference to particular preferred embodiments, it will be understood by those skilled in the art that various alterations and modifications in form and detail may be made therein.

Accordingly, it is intended that the following claims cover all such alterations and modifications as may fall within the true spirit and scope of the invention.

What is claimed is:

1. A method for transmitting at least one object in the form of recursively nested hierarchically defined object attributes between two or more networked computers, said method comprising the steps of:

installing a computer program in each said networked computer, each of said computer programs containing instructions for manipulating and displaying said at least one object on a computer screen of one or said networked computers;

defining a command protocol that is capable of representing said objects so that each said object is separately identifiable on any one of said networked computers and can be processed on any one of said networked computers independently from other ones of said objects; said command protocol being used to represent, store, transmit and receive each said object in a hierarchical form that is independent of the type of computer to which said object may be transmitted, on which said object may be stored. or of the display device on which said object may be rendered for viewing;

said protocol including a plurality of command elements including structural command elements that describe the structure of objects to be displayed on said computer screen in terms of objects on said screen and operations performed on said objects and processing command elements that control each said networked computer to interpret information signals that are received by said networked computers from other of said networked computers, said structural command elements and said processing command elements being transmitted between and among said networked computers and locally operable on any of said networked computers;

each said protocol command element having a length that is divided into a fixed length portion and a variable length portion, said fixed length portion including a processing command and the size of said variable length portion; and said variable length portion including information characterizing the particular object to which said processing command is directed.

2. A method as described in claim 1, wherein said variable length portion of at least one of said commands includes a fixed length subportion and a variable length subportion;

said fixed length subportion including identification information for a particular object, and information specifying the length of said variable length subportion; and said variable length subportion including information regarding parameters which define said particular object.

3. A method as described in claim 1, wherein said variable length portion of said protocol command elements comprises information identifying the object and parameters describing manipulations performed by said networked computers upon said object.

4. The method in claim 1, wherein said information includes at least one information item and each said information item having a total length that is dependant on the particular information item; said method further comprising:

reducing the data for each information item to the minimal amount of data required to represent said item, said minimum amount of data including a command data element and a descriptive data element; and representing each said information item by a recursively nested data structure, said data structure providing a plurality of entries, each said entry including a command portion having a fixed length and a descriptive portion having a variable length; each said descriptive portion further having a fixed length portion and a variable length portion.

5. The method in claim 1, further comprising steps of:

transmitting said at least one object using said command protocol from a first one of said networked computers to a second one of said networked computers;

storing said at least one transmitted object using said command protocol on said second networked computer; and manipulating said at least one stored object on a processor within said second networked computer.

6. The method in claim 5, further comprising steps of:

after manipulating said at least one stored object on said second networked computer, transmitting said object to said first networked computer, storing said object and manipulating said object on said first computer.

7. A method for transmitting at least one information item in the form of recursively nested hierarchically defined information item attributes between networked computers and storing said transmitted information item after receipt by said networked computer, said method comprising the steps of:

defining a command protocol that represents said information items so that each said information item is separately identifiable on any one of said networked computers and can be processed on any one of said networked computers independently from other ones of said information items; said command protocol representing each said information item in a hierarchical form that is independent of the type of computer to which said object is transmitted or on which said object may be manipulated;

said protocol including a plurality of command elements including command elements that describe the structure of said information items and command elements that describe manipulation operations performed on said information items, said command elements being transmitted between and among said networked computers and locally operable on any of said networked computers;

each said protocol command element having a length that is divided into a fixed length portion and a variable length portion, said fixed length portion including a command and the size of said variable length portion;

said variable length portion including information characterizing the particular information item to which said processing command is directed;

transmitting said at least one information item using said command protocol from a first one of said networked computers to a second one of said networked computers;

storing said at least one transmitted information item using said command protocol on said second networked computer; and manipulating said at least one stored information item on said second networked computer.

8. A method as described in claim 7, wherein said variable length portion of at least one of said commands includes a fixed length subportion and a variable length subportion;
- said fixed length subportion including identification information for a particular information item, and information specifying the length of said variable length subportion; and
- said variable length subportion including information regarding parameters which define said particular information item.

9. A method as described in claim 7, wherein said variable length portion of said protocol command elements comprises information identifying the information item and parameters describing manipulations performed by said networked computers upon said information item.

10. The method in claim 7, wherein said information includes at least one information item and each said information item having a total length that is dependant on the particular information item; said method further comprising:
- reducing the data for each information item to the minimal amount of data required to represent said item, said minimum amount of data including a command data element and a descriptive data element;
- representing each said information item by a recursively nested data structure, said data structure providing a plurality of entries, each said entry including a command portion having a fixed length and a descriptive portion having a variable length; and
- each said descriptive portion further having a fixed length portion and a variable length portion.

11. The method in claim 10, wherein said information items comprise graphical object information items; and said minimum amount of data include data selected from the group consisting of object center, object radius, object vertex, and combinations thereof.

12. The method of claim 7, wherein said information items include at least one graphical object.

13. A method for transmitting a graphical object between any two of a plurality of networked computers for processing on any one or more of said networked computers, said method comprising the steps of:
- executing a computer program in at least one of said networked computers, said execution including executing instructions for transmitting a description of said object and the manner in which said object or portions thereof are to be processed on said networked computers;
- said object being transmitted and stored according to a predetermined description protocol, said description protocol including:
  - an information set representing objects so that each object is separately identifiable and can be processed independently from other objects on any of said networked computers, said information set representing each said object in a form that is independent of the type of network computer that may transmit or receive said object and independent of the type of network computer on which said object may be stored or processed;
  - a first plurality of commands that describe the objects;
  - a second plurality of commands that describe operations performed on said objects;
  - a third plurality of commands that control each said networked computer to interpret information signals that are received by said networked computers from other of said networked computers;
  - each said command having a length that is divided into a fixed length portion and a variable length portion, said fixed length portion including a command and the size of said variable length portion; and
- said variable length portion including information characterizing the particular object to which said processing command is directed.

14. The method in claim 13, further comprising steps of:
- transmitting said at least one object using said command protocol from a first one of said networked computers to a second one of said networked computers;
- storing said at least one transmitted object using said command protocol on said second networked computer; and
- manipulating said at least one stored object on a processor within said second networked computer.

15. The method in claim 14, further comprising steps of:
- after manipulating said at least one stored object on said second networked computer, transmitting said object to said first networked computer, storing said object and manipulating said object on said first computer.

16. The method in claim 13, wherein at least one of said network computers includes a display device on which an object may be rendered; and said information set representing each said object represents the object in a form that is independent of the type of display device of said at least one network computer on which said object may be rendered for viewing.

17. A computer program product for use in conjunction with a computer system, the computer program product comprising a computer readable storage medium and a computer program mechanism embedded therein, the computer program mechanism, comprising:
- a program module that directs said computer system to function in a specified manner in order to transmit at least one object in the form of recursively nested hierarchically defined object attributes between two or more networked computer systems, the program module including instructions for:
- manipulating and displaying said at least one object on a computer screen of one or said networked computers; and
- executing commands provided according to a defined command protocol that is capable of representing said objects so that each said object is separately identifiable on any one of said networked computers and can be processed on any one of said networked computers independently from other ones of said objects; said command protocol being used to represent, store, transmit and receive each said object in a hierarchical form that is independent of the type of computer to which said object may be transmitted, on which said object may be stored, or of the display device on which said object may be rendered for viewing;
- said protocol including a plurality of command elements including structural command elements that describe the structure of objects to be displayed on said computer screen in terms of objects on said screen and operations performed on said objects and processing command elements that control each said networked computer to interpret information signals that are received by said networked computers from other of said networked computers, said structural command elements and said processing command elements being transmitted between and among said networked computers and locally operable on any of said networked computers;

each said protocol command element having a length that is divided into a fixed length portion and a variable length portion, said fixed length portion including a processing command and the size of said variable length portion; and said variable length portion including information characterizing the particular object to which said processing command is directed.

18. A computer program product for use in conjunction with a network of interconnected computers including at least a first computer and a second computer, the computer program product comprising a computer readable storage medium and a computer program mechanism embedded therein, the computer program mechanism, comprising:

a program module that directs said first computer to function in a specified manner in order to transmit to or receive from said second computer at least one graphical object in the form of hierarchically defined object attributes and to process said graphical object, the program module including instructions for:

executing a computer program in at least one of said networked computers, said execution including executing instructions for transmitting a description of said object and the manner in which said object or portions thereof are to be processed on said networked computers;

said object being transmitted and stored according to a predetermined description protocol, said description protocol including:

an information set representing objects so that each object is separately identifiable and can be processed independently from other objects on any of said networked computers, said information set representing each said object in a form that is independent of the type of network computer that may transmit or receive said object and independent of the type of network computer on which said object may be stored or processed;

a first plurality of commands that describe the objects;

a second plurality of commands that describe operations performed on said objects;

a third plurality of commands that control each said networked computer to interpret information signals that are received by said networked computers from other of said networked computers;

each said command having a length that is divided into a fixed length portion and a variable length portion, said fixed length portion including a command and the size of said variable length portion; and said variable length portion including information characterizing the particular object to which said processing command is directed.

19. The computer program product in claim 18, the program module further including instructions for:

transmitting said at least one object using said command protocol from said first one of said networked computers to said second one of said networked computers;

storing said at least one transmitted object using said command protocol on said second networked computer; and manipulating said at least one stored object on a processor within said second networked computer.

20. The computer program product in claim 19, the program module further including instructions for:

after manipulating said at least one stored object on said second networked computer, transmitting said object to said first networked computer, storing said object and manipulating said object on said first computer.

* * * * *